United States Patent
Williams et al.

(10) Patent No.: US 6,853,547 B2
(45) Date of Patent: Feb. 8, 2005

(54) COMPUTER DRIVE MOUNTING DEVICE AND METHOD

(75) Inventors: David D. Williams, El Paso, TX (US); Jorge A. Moriel, El Paso, TX (US); Richard A. Gibson, El Paso, TX (US); Francisco M. Mercado, El Paso, TX (US)

(73) Assignee: Axxion Group Corporation, El Paso, TX (US)

( * ) Notice: Subject to any disclaimer, the term of this patent is extended or adjusted under 35 U.S.C. 154(b) by 0 days.

(21) Appl. No.: 10/320,753

(22) Filed: Dec. 16, 2002

(65) Prior Publication Data

US 2004/0114320 A1 Jun. 17, 2004

(51) Int. Cl.[7] .................................................. G06F 1/16
(52) U.S. Cl. ........................................ 361/685; 361/683
(58) Field of Search ........................................... 361/685

(56) References Cited

U.S. PATENT DOCUMENTS

| | | | |
|---|---|---|---|
| 5,262,923 A | 11/1993 | Balta et al. | |
| 5,595,501 A | 1/1997 | Ho | |
| 5,599,080 A | 2/1997 | Ho | |
| 5,734,557 A | 3/1998 | McAnally et al. | |
| 5,801,920 A | 9/1998 | Lee | |
| 5,806,949 A | 9/1998 | Johnson | |
| 6,370,022 B1 | 4/2002 | Hooper et al. | |
| 6,456,489 B1 | 9/2002 | Davis et al. | |
| 2003/0210517 A1 * | 11/2003 | Syring et al. | |

* cited by examiner

Primary Examiner—Lynn Feild
Assistant Examiner—Yean-Hsi Chang
(74) Attorney, Agent, or Firm—Gardere Wynne Sewell LLP

(57) ABSTRACT

The present invention includes a mounting device for a computer drive that includes a flexible locking plate and one or more tabs for securing the drive. A contact point allows a portion of the locking plate to be reversibly flexed out of a plane that substantially corresponds to the plane of the flexible locking plate when not flexed is used to effect.

27 Claims, 3 Drawing Sheets

COMPUTER DRIVE MOUNTING DEVICE AND METHOD

FIELD OF INVENTION

The present invention relates to computers and computer manufacturing and more particularly to an apparatus and method to easily mount a computer drive within a drive cage.

BACKGROUND OF THE INVENTION

The consumer market in computers is very competitive and those manufacturers that are successful rely on their ability to rapidly assemble their products to meet both customer expectations and the need for high throughput in order to maintain profitability. Because of the highly competitive market in which these manufacturers operate, they seek to maximize their returns through the efficient use of their labor resources. Each added step in the manufacturing process adds to the expense of the finished product. Any change that allows the assembler to increase the number of units produced in a given period will directly impact the profitability of the enterprise.

A computer drive, such as for example a hard drive or a floppy disc drive is generally attached to a drive cage with screws. Typically two or more screws are used on each side of the drive in order to anchor the drive in place.

Depending on the location of the drive within the computer chassis and what other components are present, the number of steps and the time required to attach the screws can be substantial. The difficulty of attaching the screws also leads to the potential for assembly defects that may result in a quality control rejection at the factory, or worse, a defect in the possession of the end user requiring a return and remanufacture.

Even when properly installed, the use of screws is still problematic. The small size and metallic nature of the screws gives rise to additional problems. Since the screws are used in confined spaces, they are difficult to handle and can be dropped into positions that may lead to short circuiting or other damage to expensive components.

It is also not uncommon for a consumer to modify the configuration of their computer after purchase. This can include any number of modification including adding additional components or upgrading existing ones. If the consumer does not have the appropriate tools, or expertise to use them, there is the possibility that they will damage either the component that they are working on, or another component near by. This is especially true with computer drives mounted by small hard to reach screws in chassis positions cluttered by the presence of other system components.

It would therefore be desirable to have a mounting system for computer drives that decreases the number of repetitive steps in the mounting process, that does not increase the number of attaching elements, such as screws, used in assembling the computer, and that will decrease the likelihood that a consumer may damage their computer system while attempting to repair or upgrade the system's components.

SUMMARY OF THE INVENTION

The present invention provides an improved computer drive mounting arrangement and an improved method of mounting a computer drive.

One embodiment of the present invention is a mounting device for a computer drive that includes a flexible locking plate and one or more tabs for securing the drive. A contact point allows a portion of the locking plate to be elastically deflected or flexed out of a plane that substantially corresponds to the plane of the flexible locking plate when not flexed.

Another form of the present invention is a computer drive mounted within a computer drive cage that includes a drive mounting assembly that is made up of a flexible locking plate that includes one or more tabs for securing the drive. A contact point that allows a portion of the locking plate to be reversibly flexed out of a plane that generally corresponds to the plane of the flexible locking plate when it is not flexed, and the one or more tabs connect to the computer drive and hold it substantially within the drive cage.

Yet another form of the present invention is a method of mounting a computer drive that includes the steps of reversibly flexing a flexible locking plate that is attached to a drive cage, such that the plane of the locking plate in the flexed position is not substantially planar with the portion of the drive cage to which the flexible locking plate is attached, and placing a computer drive at least partially within the drive cage, and releasing the reversibly flexed flexible locking plate such that the flexed portion returns to a position that is substantially planar to the portion of the drive cage to which the flexible locking plate is attached. This results in the contacting one or more mounting tabs of the flexible locking plate with the computer drive.

DETAILED DESCRIPTION OF THE INVENTION

Although making and using various embodiments of the present invention are discussed in detail below, it will be appreciated that the present invention provides many applicable inventive concepts that may be embodied in a wide variety of contexts. The specific embodiments discussed here are meant to be illustrative of specific examples of how the present invention may be made and used and are not meant to limit the scope of the invention in any way.

Figure 1:
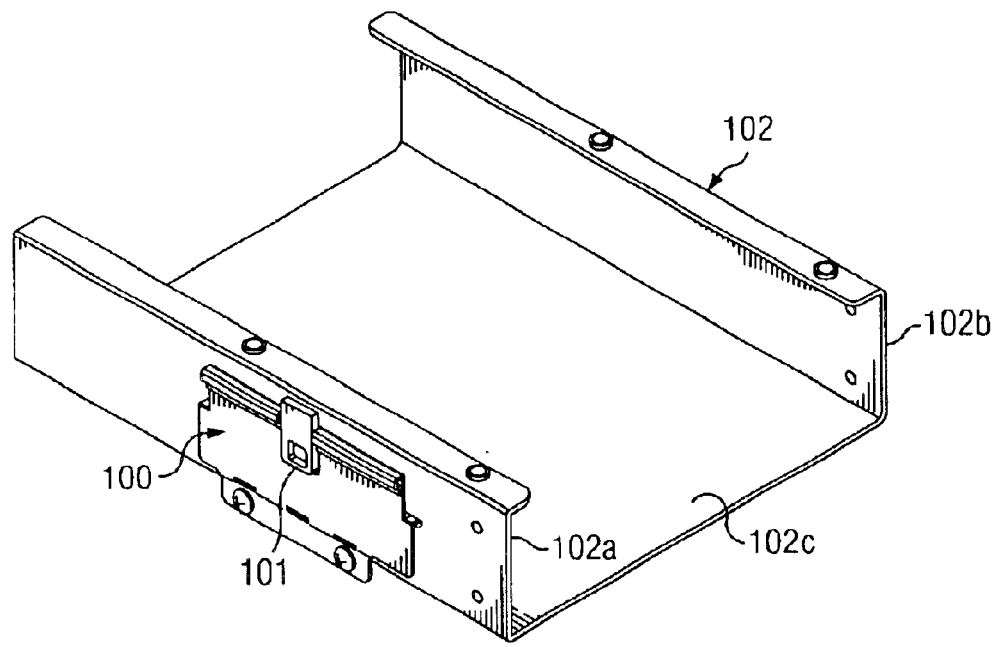
FIG. 1 is a perspective view of a screwless computer drive attachment device connected to a drive cage in accordance with the present invention.

Referring to FIG. 1, the drive attachment device of the invention is characterized by a flexible locking plate 100 that includes a rotateable lever 101 is attached to a drive cage 102. Cage 102 is shown as a generally channel shaped member having opposed generally planar side walls 102a and 102b interconnected by an integral wall 102c. The flexible locking plate 100 is depicted in the closed or mounted position in FIG. 1. In this position a first plate portion 100a of the locking plate 100 is substantially contiguous with the sidewall 102a of the drive cage 102 to which the locking plate is attached. The attachment of the flexible locking plate 100 to the drive cage 102 may be accomplished by any suitable means. Such means include, but are not limited to, screws, rivets, welds and the like. While screws are one element for attachment of the locking plate 100 to the drive cage 102, it is important to note that no screws are subsequently used to mount the drive in the drive cage. By way of example, a lower, generally planar second plate portion 100a of locking plate 100 is secured to sidewall 102a by spaced apart blind rivets 105. The attachment of the locking plate 100 to the drive cage 102 may typically be accomplished during the manufacture of the drive cage itself and thus adds no steps to the actual assembly of a computer chassis assembly that the drive cage could be incorporated into.

Figure 4:
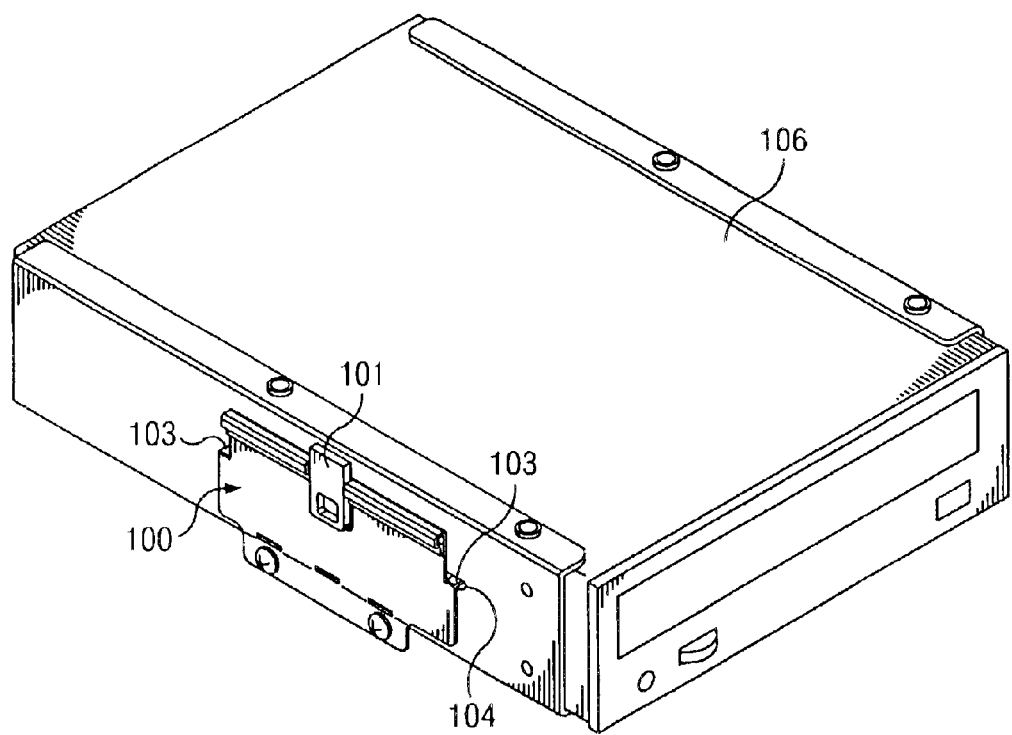
FIG. 4 is a perspective view of a computer drive mounted in a drive cage by means of a screwless computer drive-mounting device in accordance with the present invention.
Figure 5:
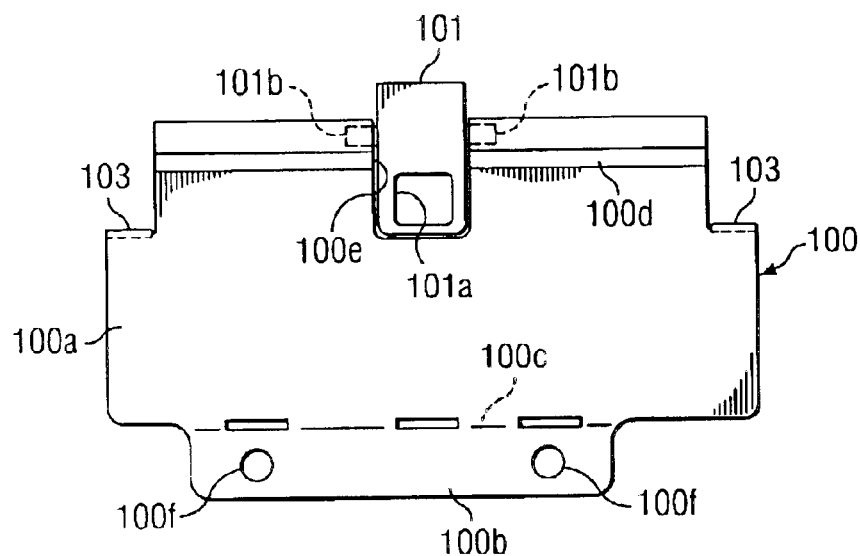
FIG. 5 is a side elevation of the drive attachment device shown disconnected from a drive cage.
Figure 6:
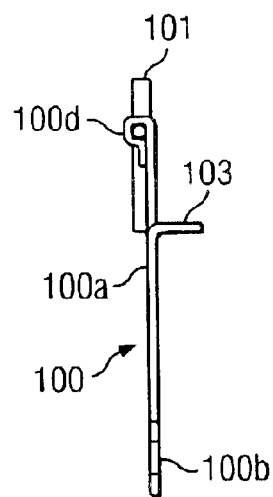
FIG. 6 is an end view of the attachment device shown in FIG. 5.
Figure 7:
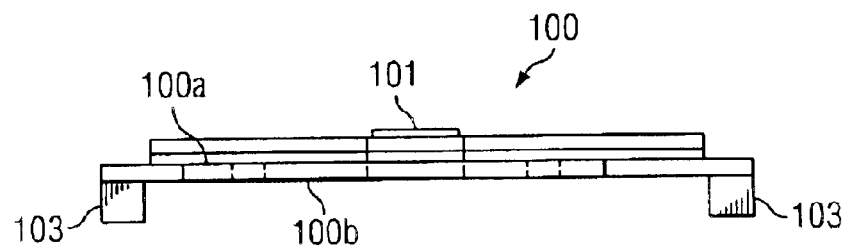
FIG. 7 is a bottom plan view of the attachment device shown in FIGS. 5 and 6.

Referring briefly to FIGS. 5, 6 and 7 the drive locking plate 100 is illustrated in further detail. The locking plate 100 is preferably formed of metal or plastic plate including the first plate part 100a and the second plate part 10b. Plate parts 100a and 10b are integrally joined along a bend line 100c which forms an elastic living hinge allowing the plate part 100a to be flexed or deflected with respect to the plate part 100b in an elastic manner so that when the plate part 100b is secured to the sidewall 102a the plate part 100a may be elastically deflected away from the sidewall 102a and held in the inflected position by the lever 101. However, when the lever 101 is rotated to a position substantially coplanar with the plate part 100a, as shown in FIGS. 1, 4, and 5, the plate part 100a will return to a position substantially coplanar with the plate part 10b. Plate part 100b includes spaced apart fasteners receiving openings 100F for receiving rivets 105, respectively.

Referring still further to FIGS. 5, 6 and 7, the lever 101 preferably includes a generally planar tab like member having a recess 101a formed therein for digital manipulation of the lever. Moreover, the locking plate 100 may be formed to be folded back on itself at an upper longitudinal edge portion 100d to form opposed openings for receiving respective opposed trunnions 101b, FIG. 5, of lever 101 for supporting the lever in a notch 100e opening to the upper side edge of the plate part 100a, as shown in FIG. 5. Accordingly, lever 101 is supported on the locking plate 100 for pivotal movement into a working position, as shown in FIG. 2, but may be rotated back to a position substantially coplanar with the plate part 100a to allow the locking tabs 103 to project through openings 104, one shown in FIG. 2, formed in cage sidewall 102a.

Figure 2:
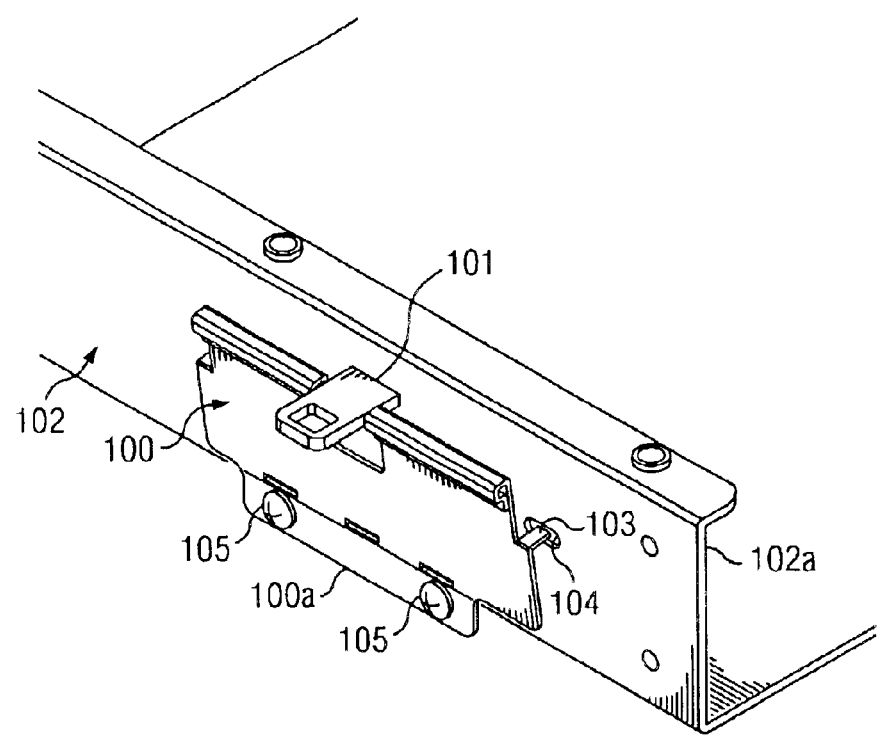
FIG. 2 is another perspective view of a screwless computer drive attachment device in accordance with the present invention on a larger scale and is shown in an open or installation configuration.

FIG. 2 depicts the flexible locking plate 100 in the open or installation position. In this position the plate part of the locking plate 100 is not substantially planar with the portion of the drive cage 102 to which the locking plate 100 is attached. By rotating the rotateable lever 101, which is also referred to as a contact point herein, of the drive cage to which the flexible locking plate 100 is attached to, a portion of the flexible locking plate 100 is flexed away from the side of the drive cage 102. In so doing, locking tabs 103 are temporarily moved out of holes 104 to allow for a computer drive 106, FIG. 3 to be inserted into the drive cage 102. The manipulation of the rotateable lever 101 may be accomplished with the aid of a tool or other suitable device. The attachment of the flexible locking plate 100 to the drive cage 102 is shown using blind rivets 105.

Figure 3:
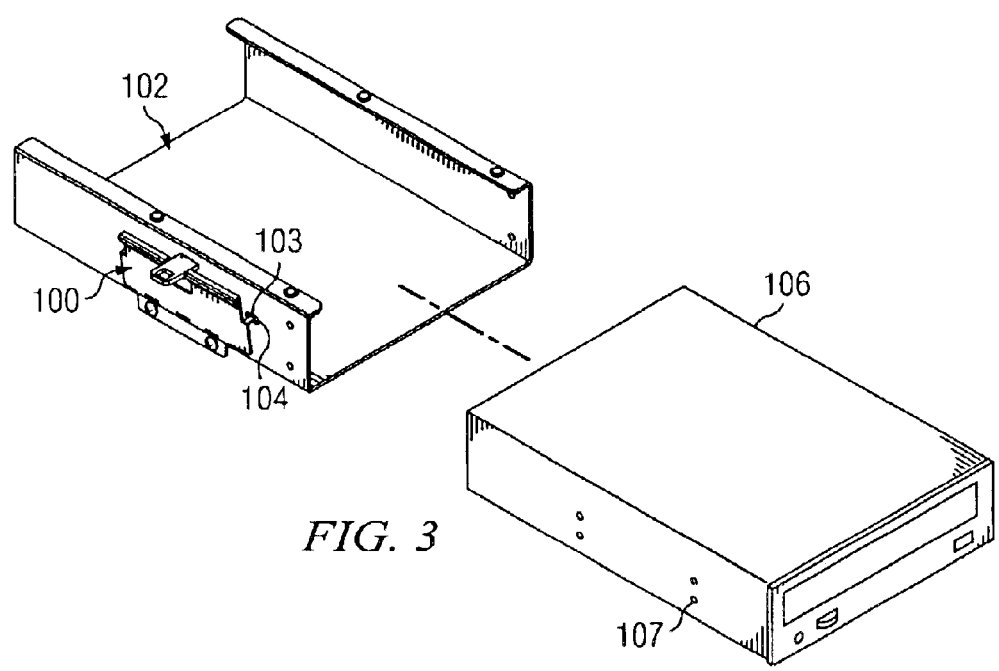
FIG. 3 is a perspective view of the mounting of a computer drive into a drive cage equipped with a screwless computer drive mounting device in accordance with the present invention.

FIG. 3 depicts the insertion of a computer drive 106 into the drive cage 102. This is accomplished with the flexible locking plate 100 in the open or installation position such that the locking tabs 103 are removed from the corresponding holes 104 in the drive cage 102. The flex in the locking plate 100 must be sufficient to allow the computer drive 106 to be placed in the drive cage 102 without interference from the locking tabs 103. The locking tabs 103 hold the computer drive 106 in place by using the existing mounting-features 107 on the computer drive 106. Such features are generally provided by the manufacturer of the computer drive 106, and are typically screw holes. The depiction in FIG. 3 is of a computer drive 106 mounted in a horizontal orientation, however there is no limitation on the orientation in which the drive cage 102 may be placed. The only limitation is that the computer drive 106 must be capable of being placed, at least partially, within the drive cage 102.

FIG. 4 depicts the computer drive 106 installed in the drive cage 102 and secured by the insertion of the locking tabs 103 through the holes 104 in the drive cage 102 and into the mounting features 107 found on the computer drive 106. The locking tabs 103 are placed through the holes 104 into the mounting features 107 by rotating the rotateable lever 101 in order to allow the flexible locking plate 100 to return to a position substantially aligned with the side of the drive cage 102 to which the flexible locking plate 100 is mounted.

What is claimed is:

1. A mounting device for a computer drive comprising:
   a drive support member and a flexible locking plate disposed on said support member and including:
   one or more tabs for securing the drive, and
   a first part operable to be reversibly flexed out of a plane that substantially corresponds to the plane of the flexible locking plate when not flexed; and
   a rotatable lever, secured to the first part, having a first position corresponding to the flexed condition of the first part and a second position corresponding to the unflexed condition.

2. The mounting device of claim 1, wherein the rotatable lever has at least one position that allows it to maintain the flex in the locking plate.

3. A computer drive mounted within a computer drive cage comprising:
   a drive mounting assembly comprising a flexible locking plate including one or more tabs for securing the drive;
   a contact point that allows a portion of the locking plate to be reversibly flexed out of a plane that generally corresponds to the plane of the flexible locking plate when it is not flexed, wherein the one or more tabs hold the computer drive substantially within the drive cage; and a rotatable lever, secured to the locking plate and disposed in such manner as to move the locking plate from an unflexed condition to a flexed condition.

4. The computer drive of claim 3, wherein the connection of the one or more tabs to the computer drive is accomplished by inserting the tabs in one or more meting holes on the computer drive.

5. The computer drive of claim 4, wherein the one or more mounting holes on the computer drive are located on a side of the computer drive.

6. The computer drive of claim 4 wherein the one or more holes on the computer are located on a top or a bottom of the computer drive.

7. A method of mounting a computer drive comprising the steps of:
   reversibly flexing, with a rotateable lever, a portion of a flexible locking plate that is attached to a drive cage, such that the plane of the flexed portion of the locking plate in the flexed position is not substantially planar with the portion of the drive cage to which the flexible locking plate is attached;

placing a computer drive at least partially within the drive cage;

releasing the reversibly flexed flexible locking plate such that the flexed portion returns to a position that is substantially planar to the portion of the drive cage to which the flexible locking plate is attached; and contacting one or more mounting tabs of the flexible locking plate with the computer drive.

8. The method of claim 7, wherein the reversible flexing is accomplished by manually manipulating a contact point.

9. The method of claim 7, wherein the releasing is accomplished by manually releasing a contact point.

10. The method of claim 7, wherein the releasing is accomplished by rotating a rotateble lever.

11. The method of claim 7, wherein the contacting of the mounting tabs is accomplished by at least partial insertion of the tabs into one or more holes in the computer drive.

12. The method of claim 7, wherein the reversible flexing is accomplished with the use of a tool.

13. The method of claim 7, wherein the releasing is accomplished with a tool.

14. The method of claim 7, wherein the flexible locking plate is attached to a side of the drive cage.

15. A method of mounting a computer drive comprising the steps of:

reversibly flexing a portion of a flexible locking plate that is attached to a drive cage, such that the plane of the flexed portion of the locking plate in the flexed position is not substantially planar with the portion of the drive cage to which the flexible locking plate is attached;

placing a computer at least partially within the drive cage;

releasing the reversibly flexed flexible locking plate by rotating a rotatable lever, such that the flexed portion returns to a position that is substantially planar to the portion of the drive cage to which the flexible locking plate is attached;

contacting one or more mounting tabs of the flexible locking plate with the computer drive.

16. The method of claim 15, wherein the reversible flexing is accomplished by manually manipulating the rotatable lever.

17. The method of claim 15, wherein the releasing is accomplished by manually releasing the rotatable lever.

18. The method of claim 15, wherein the contacting of the mounting tabs is accomplished by at least partial insertion of the tabs into one or more holes in the computer drive.

19. The method of claim 15, wherein the reversible flexing is accomplished with the use of a tool.

20. The method of claim 15, wherein the releasing is accomplished with a tool.

21. The method of claim 15, wherein the flexible locking plate is attached to a side of the drive cage.

22. A peripheral device securing mechanism for a computer system comprising:

a peripheral device support cage;

a peripheral device, removably disposed within said support cage, comprising at least one mounting hole;

a flexible locking plate, disposed on said support cage, having at least one protruding tab; and a rotatable lever disposed on the flexible locking plate in such manner as to move the protruding tab from a first position in engagement with said mounting hole to a second position out of engagement with said mounting hole.

23. The mounting mechanism of claim 22, wherein the support cage and peripheral device comprise at least one generally planar surface each, at least one generally planar surface of the support cage having close proximity to at least one generally planar surface of the peripheral device.

24. The mounting mechanism of claim 22, wherein the support cage has at least one mounting hole corresponding to at least one mounting hole of the peripheral device.

25. The mounting mechanism of claim 24, wherein at least one protruding tab on a flexible locking plate passes through a mounting hole on the peripheral device and through a corresponding hole in the support cage.

26. The mounting mechanism of claim 22, wherein the flexible locking plate is disposed on a planar surface of said support cage, and is attached along one edge.

27. The mounting mechanism of claim 22, wherein the rotatable lever has a first position wherein the locking plate is coplanar with a side of the support cage and a second position wherein the lever is flexed and held away from the side of the support cage.

* * * * *